United States Patent [19]

Freudenschuss

[11] 4,101,209
[45] Jul. 18, 1978

[54] CINE CAMERA

[75] Inventor: Otto Freudenschuss, Vienna, Austria

[73] Assignees: Karl Vockenhuber; Raimund Hauser, both of Vienna, Austria

[21] Appl. No.: 721,222

[22] Filed: Sep. 8, 1976

[30] Foreign Application Priority Data

Sep. 8, 1975 [AT] Austria .................................. 6899/75

[51] Int. Cl.² ............................................ G03B 21/36
[52] U.S. Cl. .................................. 352/91 C; 352/178
[58] Field of Search ............... 352/91 R, 91 C, 91 S, 352/217, 121, 169, 181, 174, 178

[56] References Cited

U.S. PATENT DOCUMENTS

| | | | |
|---|---|---|---|
| 1,104,873 | 7/1914 | Butcher | 352/181 |
| 3,246,944 | 4/1966 | Winkler | 352/91 S |
| 3,549,249 | 12/1970 | Katsuyama | 352/91 S |
| 3,712,720 | 1/1973 | Winkler | 352/91 C |
| 3,721,492 | 3/1973 | Kessler | 352/169 |
| 3,731,997 | 5/1973 | Iida | 352/91 S |
| 3,851,956 | 12/1974 | Komine | 352/91 C |
| 3,973,841 | 8/1976 | Gehlert | 352/91 C |

*Primary Examiner*—Monroe H. Hayes
*Attorney, Agent, or Firm*—Fleit & Jacobson

[57] ABSTRACT

The invention relates to a cine camera with a shutter and a release which can be moved in the manner of a sequence switch from an inoperative position into two different operative positions, the shutter being switched on in the first operative position which follows the inoperative position and a stopping down device being switched on in the second operative position of the release.

22 Claims, 11 Drawing Figures

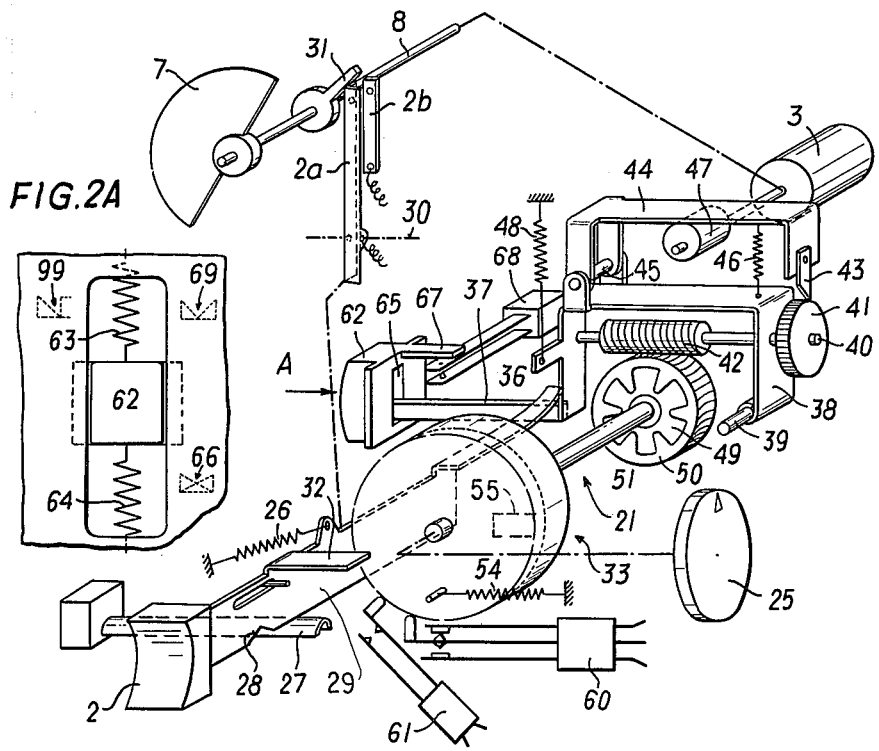
FIG. 2
FIG. 2A
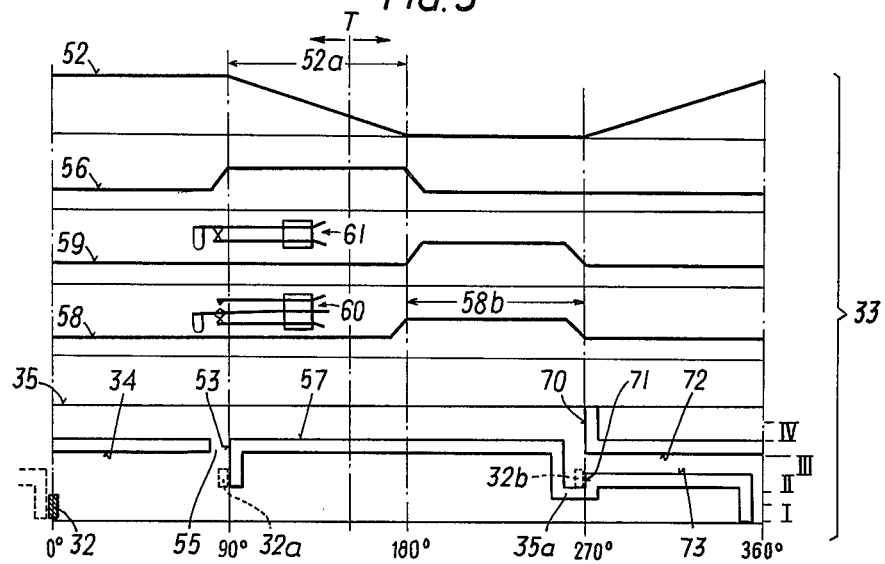
FIG. 3

CINE CAMERA

A film camera of this kind is disclosed in the German Offenlegungsschrift No. 2,041,056. Although this arrangement is advantageous since it is possible to stop down or to cease stopping down at any desired time without incurring the risk of camera shake due to manipulation of an additional control, there is also a serious disadvantage. This is because it is possible to move the release from its inoperative position directly into the second operative position which results in stopping down so that stopping down commences immediately in an undesirable manner.

It is the object of the invention to retain the advantages of the known solution to the problem but without tolerating its disadvantage. According to the invention this is achieved by the provision of a blocking device which is controlled by a timer for the positive stopping of the release in the course of its motion from the inoperative position into the first operative position which engages the film transport the blockage of the release in this operative position being releasable by the timer after a predetermined time has elapsed and with the blocking device rendered inoperative the release can be moved at any desired time into the second operative position to switch on the stopping down device. The user of the camera is therefore compelled to stop the release initially in a first operating position which engages the film transport and will therefore certainly not unintentionally move the release into the stopping down position after the blocking device is rendered inoperative.

Further details of the invention are disclosed in the description hereinbelow of embodiments which are diagrammatically illustrated in the drawing.

FIG. 1 shows a camera according to the invention in an axonometric view,

FIG. 2 showing details.

FIG. 2A is a view along the arrow A of FIG. 2.

FIG. 3 is a development of several cams shown diagrammatically in FIG. 2.

Figure 4:
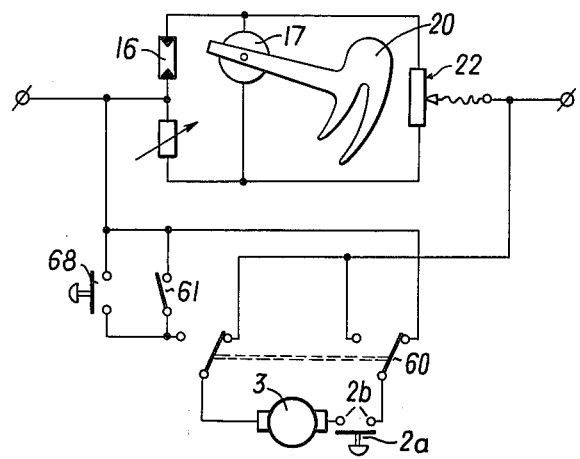
FIG. 4 is the relevant circuit diagram.

The outside of a camera (FIG. 1) is provided with a release button 2 arranged in the manner of a sequence switch to energize a motor 3 in a first operating position through a release switch 2a (FIG. 4). The motor 3 in turn drives a claw 4 in a known manner, not shown, for the step-by-step transport of a film 6 which is supported in a cassette 5 and drives a shutter diaphragm 7 which co-rotates with a spindle 8. The motor 3 also drives a spindle 11 in known manner through a worm 9 and a wormwheel 10, a plate spring 12, forming part of a friction clutch, and a gearwheel 13 being mounted on the said spindle 11, the drive being transmitted from said gearwheel via a driver 14 to a take-up stub 15 of the cassette.

The camera also incorporates a known exposure control system, shown in detail in FIG. 4, and having a photoelectric transducer 16 arranged in a comparator circuit the output of which is connected to an electromotoric transducer such as a galvanometer 17 which, in the illustrated embodiment, is adapted to move a diaphragm vane situated in the diaphragm space between a supplementary lens and a base lens 19.

Figure 1:
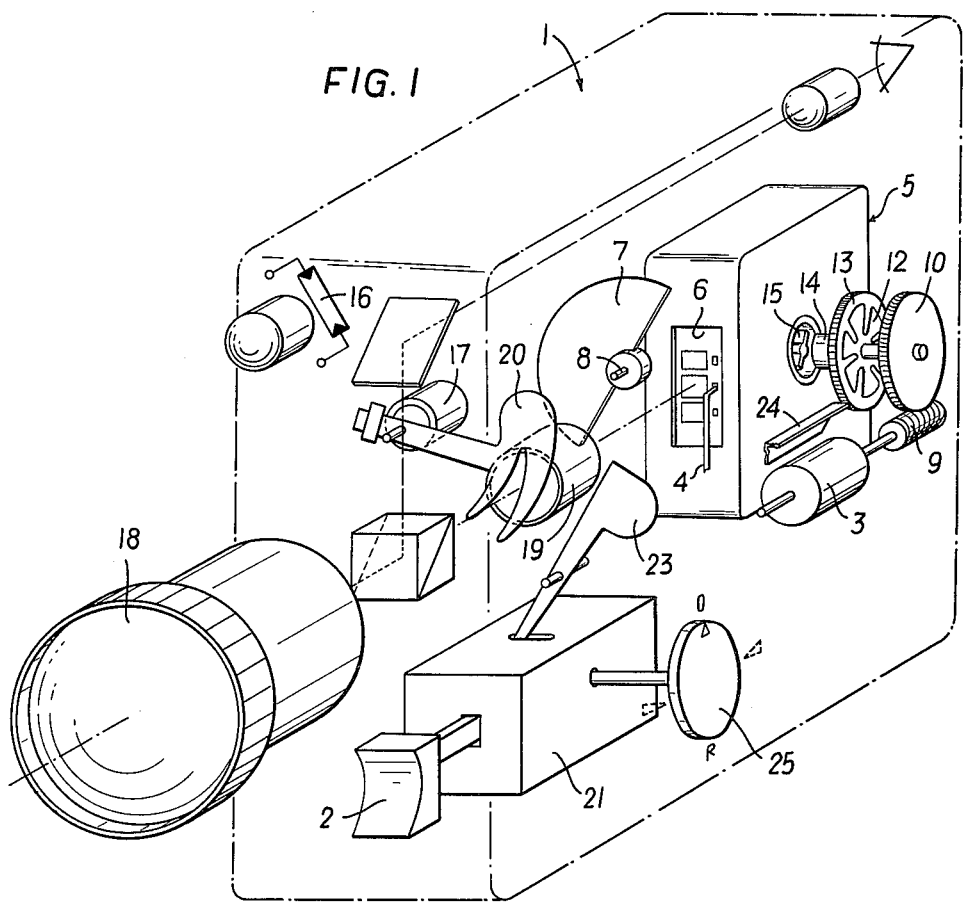

If the release 2 is moved beyond the operative position which switches on the motor into a further operative position, it will actuate a programmer 21, diagrammatically indicated in FIG. 1, which on the one hand adjusts a variable resistor 22 of the bridge circuit according to FIG. 4 for the purpose of stopping down and on the other hand moves an auxiliary shutter 23 into the optical path of the lens 18, 19 when the film 6 is rewound but moves a locking bar 24 into the teeth of the take-up wheel 13 during the stopping down motion so that the take-up motion of the film 6 is interrupted despite the continuing operation of the motor 3 so that the friction clutch 12, 13 slips. A handwheel 25 situated on the outside of the camera is reset during the programme routine and thus indicates to the user the appropriate programme setting. Where appropriate, said handwheel can also be used for preselecting the programme in a manner similar to that already described in the German Offenlegungsschrift No. 1,933,579 or in the German Offenlegungsschrift No. 2,036,494. The parts of the camera 1 described so far are completely conventional.

The construction of the release 2 enables stopping down to commence or to cease at any desired time without the need for operating any other handle in addition to the release 2. However, there is a risk of the user of the camera 1 moving the release 2 immediately into the second operative position which switches on the programmer 21. It is therefor the object of the invention to prevent such erroneous operation. FIG. 2 shows the release 2 in its inoperative position. The release is pulled into this inoperative position by a spring 26. However, if it is moved against the force exerted by the spring 26, a ratchet spring 27 latches after a short distance into a ratchet indentation 28 of a release slide 29 which is mounted on the release knob 2. The release slide 29 is connected in known manner, merely indicated in FIG. 2, to the contact 2a (see FIG. 4) which is pivotable about an axis 30 which is diagrammatically indicated. The contact 2a has a L-shaped cross-section, its member situated parallel with the spindle 8 being situated in the path of a conventional locking cam 31 which is mounted on the spindle 8 when the release knob 2 is in the inoperative position to stop the shutter in the closed position in which the shutter disc 7 is positioned in the optical path of the lens 18, 19. If the release 2 is therefore moved into its first operative position in which the ratchet spring 27 engages with the ratchet recess 28, the release contact 2a will be pivoted in the clockwise direction by reference to FIG. 2, to release the locking cam 31 and to bear against a stationary contact 2b. The circuit of the motor 3 is thus closed.

The release slide 29 has an extension 32 which is moved against a cam stack 33 of the programmer 21 when the slide 29 is moved against the force exerted by the spring 26. The leading cam of the said cam stack is shown as a plan view in developed form in FIG. 3 and the outside of the said cam opposite the extension 32 has a locking surface 34. FIG. 3 shows different positions of the extension 32 corresponding to different positions of the release 2 and of the release slide 29, these positions being designated with I – IV. Accordingly, the release moves from its inoperative position I into its first operative position III in which not only the ratchet spring 27 drops into the ratchet recess 28, but the extension 32 simultaneously abuts against the locking surface 34 of the first cam 35 of the cam stack 33. This prevents the user of the camera 1 moving the release 2 directly from the inoperative position I into the second operative position IV.

A relatively hard leaf spring 36 is mounted at the end of the release slide 29. The said leaf spring 36 bears on an arm 37 which can be pivoted with a frame 38 about an axis 39. The frame 38 is raised under the action of a spring 48 when the release 2 is in the inoperative position I. A spindle 40, one end of which is provided with a ratchet wheel 41 and the middle of which is provided with a worm 42, is supported on the frame 38. The ratchet wheel 41 co-operates with a ratchet 43 which is supported on a ratchet arm 44 which in turn can be pivoted about a spindle 45 suported on the frame 38 and is biased by a spring 46. Under the load of the spring 46 the ratchet arm 44 bears on a cam lobe 47 mounted on the motor spindle of the motor 3 to confer on the ratchet arm 44 and therefore on the ratchet 43 a reciprocating up and down motion when the motor 3 rotates. This motion of the ratchet arm 44 is transmitted by the ratchet 43 and the ratchet wheel 41 to the worm 42. However, this is possible only if the motor 3 is switched on, i.e. in the first operative position III of the release 2. In this position of the release 2 the leaf spring 36, which is mounted on the release slide 29, is displaced relative to the arm 37 so that the force exerted by the lead spring 36 has correspondingly increased as a result of which the frame 38 is pivoted against the action of the relatively weak spring 46 in the anticlockwise direction about the axis 39 so that the worm 42 meshes with a wormwheel 49. The wormwheel 49 is coupled through a friction clutch with a plate spring 50 to the programme control spindle 51 of the programmer 21 so that the latter is driven by the above-described parts when the release 2 is in the operative position III.

As shown in FIG. 3, no action takes place in the course of rotation of the cam stack 33 through the first 90°, i.e. the cam 52 which controls the variable resistor 22 leaves the setting of the said resistor 22 unchanged end and the remaining cams - which will be described subsequently - initially do not cause any change. Towards the end of the first quarter-rotation of the cam stack 33 a stop abutment surface 53 of the cam 34 will abut against the projection 32 of the release slide 29 as shown in broken lines in FIG. 3. Since the entire cam stack 33 is coupled to the camera drive via the friction clutch 49, 50 the said clutch will slip and the cam stack 33 is initially stopped while the clutch 42, 49 is still engaged. Since the camera drive also continues to operate through the motor 3, the user of the camera 1 is able to continue filming. If the film scene is to be terminated, the camera user will have the option to simply release the release button 2 which will then turn into its inoperative position I under the action of the spring 26. Since the end of the leaf spring 36 will then simultaneously bear upon the arm 37, the force of the spring 48 will be predominant so that the worm 42 is lifted out of mesh with the wormwheel 49 by the frame 38. The transmissive connection to the cam stack 33 is thus disengaged and in the illustrated embodiment the said cam stack returns into its starting position under the action of a restoring spring 54. The above-described procedure can then begin anew.

If the stop abutment surface 53 (FIG. 3) bears upon the extension 32 after a relatively short time, the user of the camera 1 can also achieve stopping down by moving the release further to the right by reference to FIG. 2. In the region of the stop abutment surface 53 the locking surface 34 of the cam 35 has a recess 55 which enables the extension 32 to pass through. However, once the extension 32 has passed through the recess 55 it will find no continuation of the stop abutment surface 53 so that the cam stack 33 is able to continue rotation in this said second operative position IV of the release. The stopping down programme then commences in the usual manner. At the same time, the take-up locking device 24 shown in FIG. 1 is actuated by a cam 56 and blocks the take-up motion of the film in the cassette 5.

To prevent an early return of the release 2 into its inoperative position, to interupt the stopping down operation in which the adjustable resistor 22 (FIG. 4) is adjusted by the cam 52 through its section 52a, the stop abutment surface 53 is adjoined by a further locking surface 57a which prevents the extension 32 returning into the inoperative position I. During the stopping down motion the spring 54 (FIG. 2) is constantly stressed and biases the cam stack 33 in the anticlockwise direction. However, as soon as the cam stack 33 reaches a dead-centre point T (FIG. 3) the action of the spring 54 reverses and it will then bias the programmer 21 in the clockwise direction. Two cams 58, 59 come into action at the end of the stopping down programme, the cam 58 co-operating with a changeover switch 60 which is moved from the position shown in solid lines in FIG. 4 into the broken line position. This changes the direction of rotation of the motor 3. However, since a switch 61 is initially open the polarity of the motor 3 will be reversed but the motor is as yet unable to start in the opposite direction. The reason for this is due to the fact that the user of the camera is to have the option to select a programme. If only a lap dissolve programme were desired it is possible for the cam 59 and for the switch 61 to be omitted because instantaneous rewinding of the film 6 would then be an advantage. The said rewinding action takes place over the section 58b, i.e. between 180° and 270° of the cam stack 33.

The illustrated embodiment however provides options for the programme. To this end, a knob 62 can be slid from the outside of the camera. In the illustrated case, as shown by FIG. 2A, the sliding knob is retained in a middle position by means of two tension springs 63, 64 which act in opposite directions but are omitted from FIG. 2 in the interests of clarity. On its side nearest to the arm 37 the sliding knob 62 has a slot 65 into which the arm 37 engages. The arm 37 is therefore able to move freely within the slot 65. If a lap dissolve programme ("X diaphragm") is required, it is merely necessary to move the slide 62 briefly in the downward direction in accordance with the symbol 66 which is shown in FIG. 2A. An actuating extension 67 of the sliding knob 62 will then close a switch 68 (see FIG. 4). The circuit diagram of FIG. 4 shows that this causes the initially opened switch 61 to be bridges so that the rewind programme can be performed in accordance with the cam section 58b, the cam 59 closing the switch 61 to obtain self-holding action. However, if the lap dissolve programme is not required the sliding knob 62 is slid in the upward direction - by reference to FIG. 2A - as a result of which opening and closing of the stop is obtained in accordance with the symbol 69 ("V diaphragm"). This action is obtained because in the course of its upward motion the sliding knob 62 entrains the arm 37 against the biasing by the spring 36 and thus pivots the frame 38 about the axis 39 so that the clutch 42, 49 is released. As a result, this brings into action the spring 54 which has already passed its dead-centre point T (FIG. 3) and will then rotate the cam stack 33 in the clockwise direction. This action continues until another stop abutment surface 70 of the cam 35 strikes against the extension 32 which then returns under the action of the spring 26 when the release button 2 is released, but is caught by a cam section 35a in a second inoperative position II. The release contacts 2a, and 2b are separated from each other in this inoperative position II so that the motor 3 is not energized but the leaf spring 36 is sufficiently powerful to retain the clutch parts 42, 49 in engagement. If the sliding knob 62 was therefore released after being briefly actuated, the leaf spring 36 will ensure that the can stack 33 is stopped in this position when the release is in the inoperative position II. A locking surface 71 is provided to prevent further rotation of the cam stack in every case even if the sliding knob 62 is erroneously retained in the top position.

To open the diaphragm it is therefore merely necessary for the release to be again actuated which causes the extension 32 to be thrust from the position 32b on the locking surface 71, as shown in broken lines, against a blocking surface 72 of the cam 35, whereupon the extension is held between the said surface 72 and a further locking surface 73 in the operative position III to the end of the diaphragm opening programme. Only then will the locking surface 73 release the extension 32 and the release 2 is able to return into its inoperative position I under the action of the spring 26.

It is clear that the sliding knob 62 is not absolutely essential within the scope of the invention. It is not necessary for the clutch 42, 49 to be disengaged in order to obtain stopping down and opening of the diaphragm in accordance with the symbol 69. Instead, it is also feasible for the programmer to be set manually to the desired position by means of the handle 25 and by overcoming the frictional force of the friction clutch 49, 50. In this case, the sliding knob 62 can be entirely omitted and it is merely necessary to provide an actuating knob or the like for the switch 68, said actuating knob being appropriately structurally combined with the handle 25. It is also not necessary to provide two clutches 42, 49 and 49, 50 which are serially disposed, instead a single clutch can suffice in appropriate circumstances.

Figure 5:
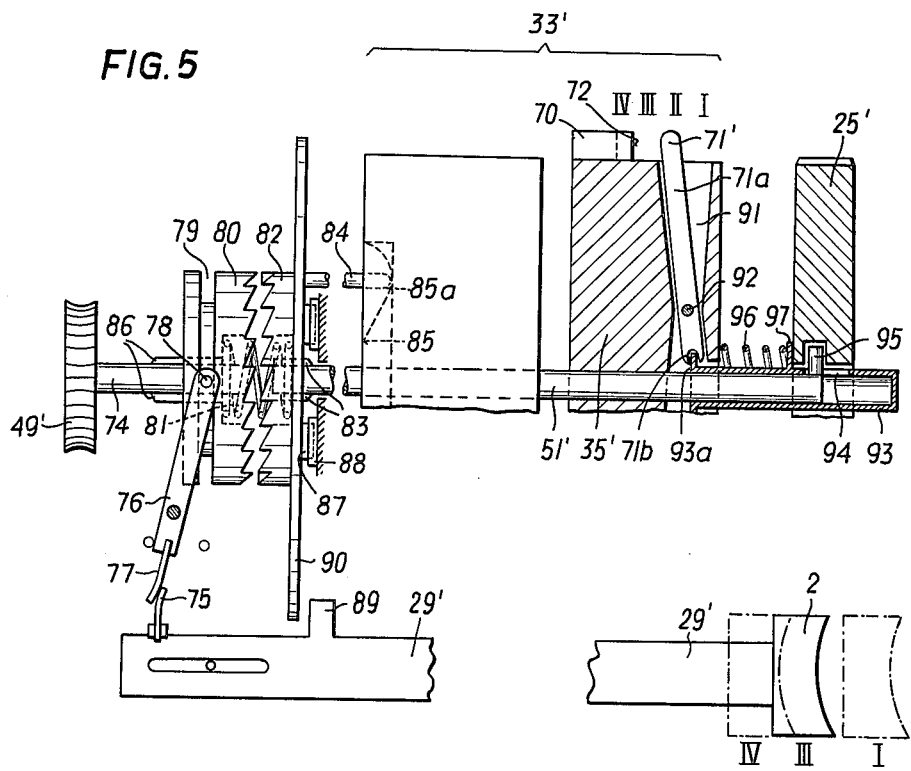
FIG. 5 shows a modification of the clutch devices and cams illustrated in FIG. 2.

A clutch of this kind together with a modified embodiment of the cam 35 is described by reference to FIGS. 5 and 6. FIG. 5 shows a programme control spindle 51' which corresponds to the programme control spindle 51 of FIG. 2 and supports a cam stack 33'. The release knob 2 is also illustrated and is combined with a release slide 29'. A drive shaft 74 on which a wormwheel 49' is mounted is in alignment with the programme control spinle 51. The drive for example through a worm 42 is illustrated in FIG. 2, is transmitted through the said wormwheel 49'.

The cam stack 33' has a cam 35' which is different from the cam 35 (FIG. 3). Only three cams, including the cam 52 (see FIG. 3) and the cam 35' of the cam packet 33' are illustrated in FIG. 6. It can be seen that the construction of the cam 35' is substantially identical to that of the cam 35 over the first 270° and the surfaces 34 and 53, the recess 55 and the locking surfaces 57 and 35a as well as the surface 70 and 72 are all provided.

When the release knob 2 is in the inoperative position I, it will be moved into the position on the right shown in broken lines by contrast to the position shown in solid lines in FIG. 5. When the release knob 2 is moved into its first operative position III, a leaf spring 75, mounted on the release slide 29', strikes against a leaf spring 77 which is mounted on a two-armed lever 76 and thus pivots the lever 76 into the position illustrated in FIG. 5. On its end which is distal with respect to the leaf spring 77 the lever 76 supports a pin 78 which engages with a slot 79 of a dog clutch part 80. The dog clutch part 80 is biased by a compression spring 81 which is stressed between the arrow 80 and another clutchmember 82. FIG. 5 shows all parts in a position in which the release knob 2 is situated in its first operative position III and the cam stack 33' has simultaneously rotated through 90° so that the extension 32, which is connected to the release knob 2 but is not shown in FIG. 5, is in position 32a (FIG. 6). The clutch member 82 is axially slidable on the programme control spindle 51'and is rotationally coupled to the spindle 51' by means of wings 83. Under the action of the compression spring 81, the clutch member 82 bears upon a cam follower tappet 84 which is guided in manner not shown and traces an axial cam 85 of the cam stack 33'. As shown clearly in FIG. 6, the cam 85 has an indentation which is situated in the region of a 90° rotation of the cam stack 33' so that the clutch member 82 is moved to the right of the normal position shown in FIG. 5. However, the clutch member 82 is moved to the left of the position shown in FIG. 5 when the cam stack 33 is in the starting positions, so that said member is initially engaged with the clutch member 80 when the release knob 2 is in the first operative position 111 and the said clutch member 80 in turn is also slidable on the drive shaft 74 but is nonrotationally coupled thereto through the wings 86.

When therelease 2 is in the operative position III the two clutch members 80, 82 are in engagement so that the programme control spinle 51' is driven. The two clutch members 80, 82 are detached from each other by the indentation 85a of the cam 85 as soon as the spindle 51' has rotated through a quarter-revolution and the extension 32 touches the stop surface 53 of the cam 35' when said extension is in position 32a to that the drive of the cam stack 33' is interrupted. The stop surface 53 could therefore also be omitted from this embodiment.

If the programme control spindle 51 is under the action of a restoring spring 54 (see FIG. 2) it is essential to ensure that the cam stack 33' is not rotated in the reverse direction by the clutch control cam 85 when the clutch 80, 82 is released. According to FIG. 5, this can be achieved by the provision on the rear of the clutch member 82 of locking projections 87 which are arranged so tha when the clutch is released they bear upon stop surfaces 88 which are fixed with respect to the apparatus and thus prevent reverse rotation of the spindle 51'.

If the user of the camera requires stopping down when the cam stack 33' is in this position, he need only move the release knob 2 in the position IV shown in dash-dot lines. The actuating extension 89 of the release slide 29' will then bear against a plate which is associated with the clutch member 82 to thrust this against the force of the compression spring 81 into re-engagement with the clutch member 80. The back-pressure is increased simultaneously through the leaf springs 75, 77 to prevent the clutch member 80 escaping under the action of the compression spring 81. Rewinding can be selected optionally in the manner already described after stopping down or this procedure can be overridden, for example by rotating the handwheel 25'. This is because the dogs of the clutch members 80, 82 permit rotation of the programme control spindle in one direction in relation to the drive.

After the cam stack 33' has rotated through 270° the extension 32 again abuts against the stop surface 70 of the cams 35', while the release 2 simultaneously returns into its inoperative position. However, it is retained in a middle position II by the cam portion 35a. In the illustrated embodiment a moving stop surface 71' is associated with the cam portion 35a. As shown in FIG. 5, the stop surface 71' can be removed from a position corresponding to the inoperative position II of the release knob 2 into a position which corresponds to the inoperative position I. In this last-mentioned position, the stop surface 71' is substantially in alignment with the cam portion 35a and thus releases the extension 32 in its position 32b.

A device illustrated in FIG. 5 is provided for moving the stop surface 71' in the manner described above. The stop surface 71' is formed on a stop level 71a which is supported on the cam body of the cam 35' in a radial operating 91 on a spindle 92. At its bottom end the stop lever 71a is provided with a fork 71b into which a flange 93a of an actuating sleeve 93 engages. The actuating sleeve 93 is disposed on the programme control spindle 51' and has slots 94 in the region of the handwheel 35' through which slots the driver extensions 95 of the spindle 51' for the handwheel 25' are able to extend. The sleeve 93 is biased by the action of a compression spring 93 which bears on the one hand on the cam body of the cam 35' and on the other hand bears on a collar 97 of the sleeve 93. Depressing the actuating sleeve 93 which is arranged coaxially with the handwheel 25' therefore enables the stop surface 71' to be adjusted.

Figure 6:
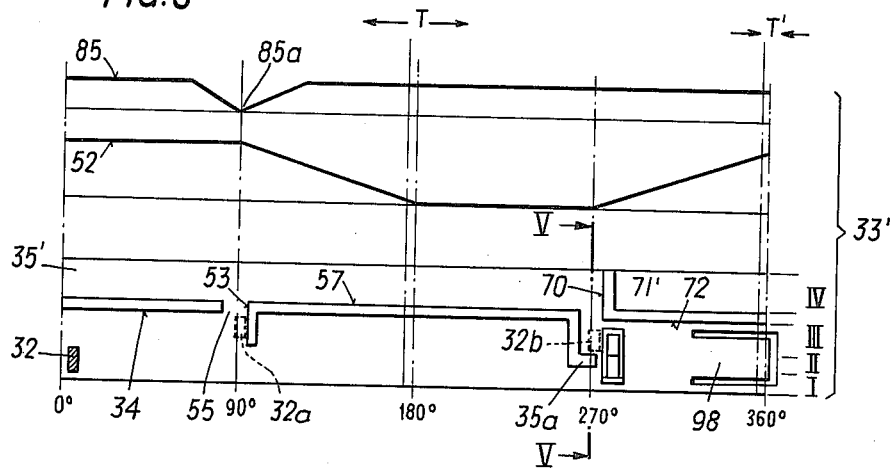
FIG. 6 is a development of the cams shown in FIG. 5 similar to FIG. 3.

If the extension 32 of the release is in position 32b, not only will the motor 3 be switched off but the clutch 80, 82 will be disengaged in the embodiment according to FIGS. 5 and 6 by contrast to the embodiment according to the previously described Figures. The purpose of the cam section 35a in this case is therefore merely to ensure reliable retention of the extension 32 in the region of the stop surface 71' but if the construction of the stop surface 71' is broader it is possible for the cam surface 35a to be omitted. After the clutch 80, 82 is disengaged, the program control spindle 51' will merely be under the action of the spring 54 (FIG. 2) through which the extension 32 in its position 32b is thrust against the stop surface 71'. As can be seen by reference to FIG. 6, the tilting point T of the spring 54 has approached close to the end of the stopping down operation which is controlled by the cam 52. The diaphragm opening procedure commences in the same way as in the previously described embodiment if the release knob 2 is again moved into its operative position III when the extension 32 is in the above-mentioned position. However, if the actuating sleeve 93 is thrust against the spring 96 the stop lever 71a will be pivoted and the stop surface 71' releases the extension 32. Since the clutch 80, 82 is disengaged when the extension 32 is in position 32b, the programme control spindle continues to pivot under the action of the spring 54 (FIG. 2) to its next dead-centre position T', thus overriding the stopping down procedure. However, the spingle 51' continues to pivot beyond the dead-centre position T' of the spring 54 because the latter and the programmer represent a mass-spring system which is capable of oscillating. A ratchet 98 is slotted into the cam body of the cam 35' to prevent reverse oscillation, the extension 32 sliding over the ratchet and dropping into it after a complete revolution of the cam stack 33. This achieves "hard" fading as indicated by the symbol 99 (FIG. 2A). If the dead-centre point T according to FIG. 6 and the movable stop surface 71' is also provided in the embodiment according to FIGS. 2 and 3 upward sliding of the sliding knob 62 will result in optional stopping down or opening of the diaphragm in accordance with the symbol 69 or 99 depending on whether or not the actuating sleeve 93 (FIG. 5) is depressed.

Figure 7:
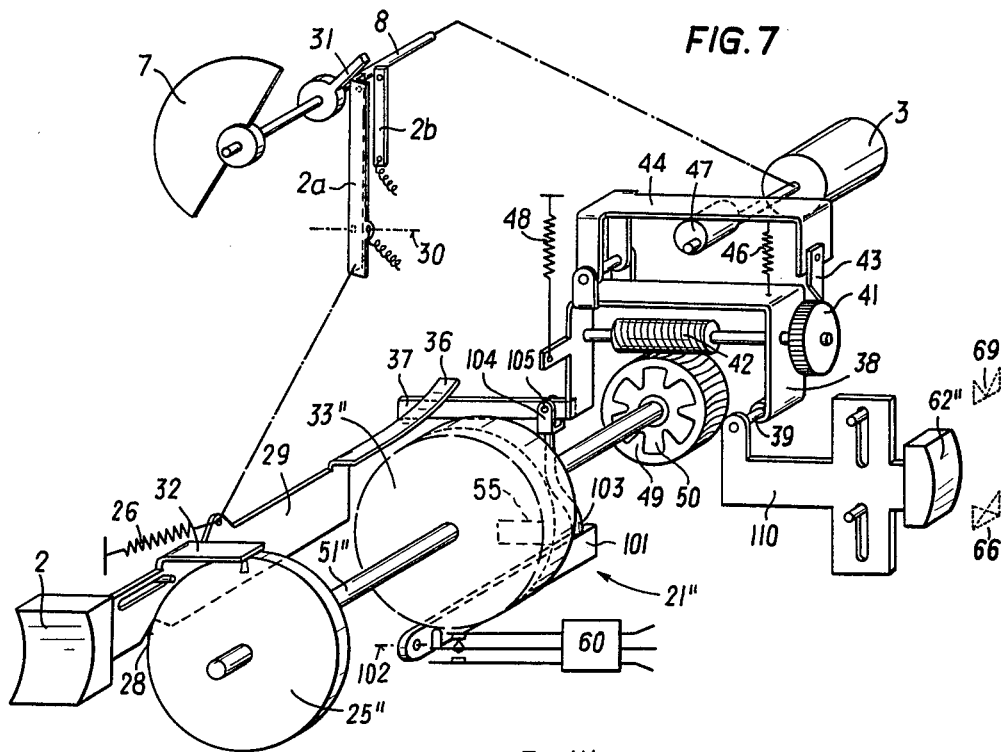
FIG. 7 shows in axonometric form another modification of the embodiment.
Figure 8:
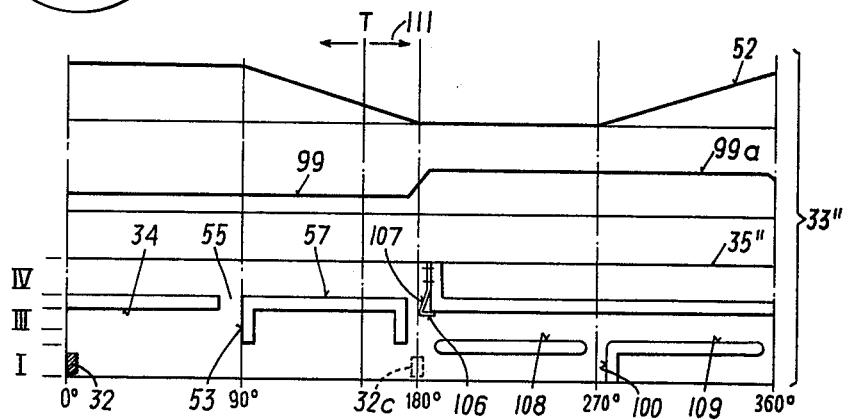
FIG. 8 is a development thereof.

In the previously described embodiments the release knob 2 had four different positions I – IV. With reference to the last-described embodiment, it had already been mentioned that the inoperative position II of the release has practically no significance and can be omitted. An embodiment in which engagement of the clutch 42, 49 is also ensured when the release 2 is in the inoperative position I will be described by reference to FIGS. 7 and 8. Of the cam stack 33", shown diagrammatically in FIG. 7, FIG. 8 merely shows a special embodiment of the cam 35" which supports the locking surface 34 and by comparison the cam 52 and a further cam 99 which controls a self-holding device for the clutch 42, 49. The construction of the cam 35' over practically the first 180° is substantially identical with the previously described cams 35 or 35' and need not therefore be explained. Accordingly, the cam is provided with locking surfaces 34, 57 and the stop surface 53 as well as with the recess 55. However the circuit in which the switch 61 is omitted or bridged and the conductor with the switch 68 is entirely omitted by contrast to FIG. 4 is different from the previous embodiment. Furthermore, the locking surface 57 extends merely to the end of the stopping down procedure so that subsequently the extension 32 of the release slide 29 moves into a position 32c. The programe control spindle 51", shown in FIG. 7, is also under the action of a toggle spring 54 (in a manner not shown) in accordance with FIG. 2. The tilting point T is shown in FIG. 8. If the extension 32 moves into its position 32c, the toggle spring 54 will come into action and would rotate the cam stick 33" through a further quarter-revolution until one stop surface 100 abuts on the extension 32. However, this is provided by the cam 99 being traced by a cam follower lever 101 which is pivotable about a spindle 102 and supports at its free end a rod 103 with a bearing fork 104 which is connected through a pin 105 to the arm 37 of the frame 38. The raised portion 99a of the cam 99 forcibly depresses the cam follower lever 101 and the said lever can no longer follow the pull of the spring 48 after the return of the release button 2 into its inoperative position 1 and after the arm 37 is released by the leaf spring 36. The clutch 42, 49 therefore remains engaged.

The spring 54, which in the embodiment according to FIG. 7 acts on a spindle, arranged parallel with the spindle 51" and driven by it or driving it in the ratio 1 : cannot become effective or cannot overcome the frictional force of the frictional clutch 49, 50 because the clutch 42, 49 remains engaged due to the cam portion 99a. Renewed operation of the release button 2 therefore causes the extension 32 to bear against the locking surface 106 of a ratchet 107, the motor being again energized in this first operative position III. Due to the polarity reversing cam 58 and its cam portions 58b (see FIG. 3), the reversing switch 60 would have been operated so that the motor 3 now rewinds the film 6 (FIG. 1). The programmer 21" as well as the programmer 21 in FIG. 2 is however driven in the same direction because of the ratchet drive 43, 41. A locking surface 108 prevents unintentional interruption of the rewinding operation when the release button 2 is released. It is only after a further quarter-revolution, i.e. after a total revolution through 270°, that the locking surface 108 will again release the extension 32 which is then able to return into its inoperative position I. Renewed operation of the release button 2 will then result in opening of the diaphragm and this operation can proceed without interruption due to a locking surface 109 of the cam 35''.

However, if merely stopping down and opening the diaphragm ("V diaphram") is required instead of lap dissolving it is necessary for the rewinding operation to by bypassed. To this end, the spindle 39 of the frame 38 is slidably supported in a carrier 110. The carrier 110 can be slid by means of a sliding knob 62'', the symbols 66 or 69 being associated with the said knob 62'' on the casing of the camera 1 (FIG. 1). If the sliding knob 62'' is therefore slid in the upward direction the frame 38 will be pivoted about the spindle 105 while disengaging the worm 42 from the wormwheel 49. The spring 54 then comes into action and after overcoming its tilting point T in the sense of the arrow 111 to rotate the cam stack 33'' until the stop surface 100 bears upon the release extension 32. The release 2 can then again be actuated to result in opening of the diaphragm. If additional "hard" opening of the diaphragm is required in the sense of the symbol 99 (FIG. 2A), it would only be necessary to construct the stop surface 100 similar to the stop surface 71'. By removing the stop surface 100 the cam stack 33'' could be rotated into its starting position without the need for again moving the release into its operative position III. If the rotation of the cam stack 33'' into its starting position is to be again effected by the spring 54, it will be advantageous to construct a ratchet 98 in accordance with FIG. 6 and to arranged the dead-centre points T, T' in the manner already shown in FIG. 6.

The stop surface 71' need not necessarily be movable along the axial direction of the spindle 51', but it can also be extensible from or retractable into the cam body in the radial direction of the cam 35', for example by connecting the actuating sleeve 93 to the stop surface 71' through a sloping cam slot which is situated on an extension of the sleeve 93, a pin of the stop surface 71' instead of the fork 71b engaging in the said slot. In this case the pivoting spindle 92 is omitted and the part 71a is guided so as to be slidable along its longitudinal axis. This also applies in the event that the stop abutment 100 is to be movable.

Figure 9:
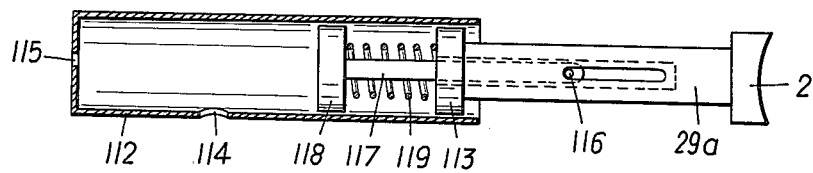
FIGS. 9 and 10 show further embodiments according to the invention.

The timer for controlling the release blocking device, constructed as a cam surface 34 in the embodiments described so far, had a cam 35, 35', 35'' situated on the programme control spindle 51, 51' or 52'' but numerous other embodiments are feasible within the scope of the invention. The mechanical construction of the timer in the form of a cam is preferred if a programmer is provided because such a programmer is in any case frequently provided for lap dissolve devices and the additional cam therefore involves practically no additional effort; however, if the use of a cam is deemed unsuitable for any reason or if an electronic programmer is provided instead of a mechanical programmer, as has already been proposed, it is also possible to use other blocking devices for the release. FIG. 9 shows a pneumatic solution to the problem. In this case the release button 2 is associated with a tubular release slide 29a the end of which supports a piston 113 which can slide in a cylinder 112. In the region which corresponds to the first operative position III the cylinder 112 has a relatively large aperture 114 and a relatively small aperture 155 at its end. A piston rod 117, the end of which supports a further piston 118, is guided in the slide 29a through a slot-pin connection 116. The two pistons 13, 118 are stressed against each other by a compression spring 119.

If the release button 2 is moved to the left - as referred to FIG. 9 - this will be initially possible without difficulty while the air enclosed in the cylinder 112 escapes until the piston 118 has covered the port 114. The piston 113 can then be slid against the piston 118 against the thrust exerted by the spring 119. Further displacement of the release button 2 however encountered powerful resistance because the remaining air in the cylinder 112 cannot escape as rapidly through the port 115. The user of the camera is therefore compelled to retain the release button 2 in this position which corresponds to the operative position II. While the air in the last part of the cylinder 112 escapes through the port 115, the compression spring 119 relaxes and the piston 118 approaches the bottom of the cylinder 122. After the time required for this procedure has elapsed, the release button 2 can be moved into its other operative position IV to initiate the stopping down procedure.

Figure 10:
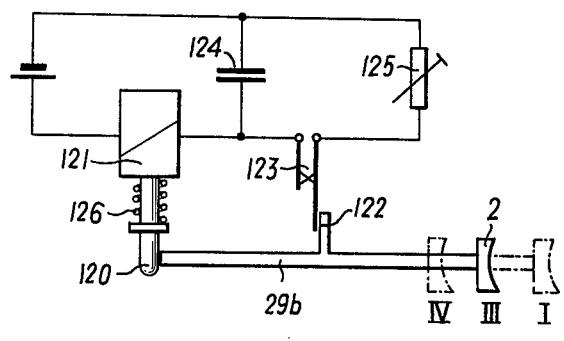

Another electromagnetic solution is shown in FIG. 10. In this case, the release button and its release slide 29b are movable until the release slide 29b bears on a locking extension 120 of the armature associated with a solenoid 121. An actuating extension 122 simultaneously closes a switch 123 which closes the circuit of the solenoid 121 but requires a capacitor 124 connected parallel therewith to be charged through a resistor 125 before the solenoid 121 can come into action. It is only when the solenoid 121 is energized that its armature with the locking extension 12 is attracted against the action of a compression spring 126 thus releasing the path for the release slide 29b to enable the release 2 to be moved into its second operative position IV.

I claim:
1. In a cine-camera for cinematographic film
optical means defining an optical axis;
means for guiding the film and for exposing successive image frames on said optical axis;
shutter means for intercepting said optical axis and being operable to alternately assume an intercepting condition and an open condition;
first drive means for said film and said shutter;
motor means for providing power for said first drive means;
fading means operable between an open condition and a fade-out condition for continuously altering the amount of light reaching the image frame on said optical axis;
release means for controlling the operation of said drive means and being movable from an inoperative position into a first operative position for rendering operative said drive means, and from the first into a second operative position to operate said fading means;
blocking means for preventing movement of said release means from the first into the second position, said blocking means having a blocking and an unblocking condition;
programming means being controlled by said release means and controlling said blocking means the blocking means after the movement of the release means from the inoperative into the first operative position remaining in blocking condition during a time interval determined by the programming means and then assuming the unblocking condition to allow the release means to be moved into the second operative position for operating the fading means.

2. Camera as claimed in claim 1, wherein said programming means comprise at least one control member moveable with respect to the release means and having a moving condition and a standstill condition, the camera further comprising
second drive means for driving said control member.

3. Camera as claimed in claim 2, wherein said control member comprises a blocking surface forming said blocking means and a clearance adjacent to said blocking-surface in the direction of movement of said control member to allow the release means to be moved for operating the fading means.

4. Camera as claimed in claim 2, further comprising first arresting means controlling the standstill condition of said control member by arresting it after said time interval.

5. Camera as claimed in claim 2, wherein said motor means provide power also to said second drive means, the camera further comprising coupling means interposed between said control member and the second drive means to allow relative movement between the second drive means and said member.

6. An improved cine camera for cinematographic film of the type having optical means defining an optical axis;
means for guiding the film and for exposing successive image frames on said optical axis;
shutter means for intercepting said optical axis and being operable to alternately assume an intercepting condition and an open condition;
drive means for said film and said shutter having an operative and an inoperative condition;
fading means operable between an open position and a fade-out position for continuously altering the amount of light reaching the image frame on said optical axis;
release means for controlling the operation of said drive means and being moveable from an inoperative position into a first operative position for rendering operative said drive means, and from the first into a second operative position to operate said fading means; the improvement comprising:
blocking means for preventing movement of said release means from the first into the second position, said blocking means having a blocking and an unblocking condition;
programming means controlled by said release means and comprising at least one control member movable in a predetermined direction by said drive means from a predetermined end position for controlling said blocking means, such that after the movement of the release means from the inoperative into the first operative position said blocking means, remains in the blocking condition during a time interval determined by the control member whereafter said blocking means assumes the unblocking condition to allow the release means to be moved into the second operative position for operating the fading means;
clutch means interposed between said control member and the drive means to allow relative movement between the drive means and said member, said clutch means being controllable by said release means and having an open condition in which the driving connection to said control means is interrupted, and a closed condition in which a driving connection is established, in inoperative position of the release means the clutch means being in open condition, at least in the first operative position of the release means the clutch means being forced to assume the closed condition; and
resetting means for moving the control member into the predetermined end position when the clutch means are in open condition.

7. Camera as claimed in claim 6, wherein said resetting means comprise return spring means.

8. An improved cine-camera for cinematographic film of the type employing optical means defining an optical axis;
means for guiding the film and for exposing successive image frames on said optical axis;
shutter means for intercepting said optical axis and being operable to alternately assume an intercepting condition and an open condition;
drive means for said film and said shutter having an operative and an inoperative condition;
fading means operable between an open condition and a fade-out conditon for continuously altering the amount of light reaching the image frame on said optical axis;
release means for controlling the operative of said drive means and being movable from an inoperative position into a first position for rendering operative said drive means, and from the first into a second operative position to operate said fading means; the improvement comprising:
blocking means for preventing movement of said release means from the first into the second position, said blocking means having a blocking means for preventing movement of said release means from the first into the second position, said blocking means having a blocking an unblocking condition;
programming means including at least one control member movable by said drive means and having a moving condition and a standstill condition, said control member controlling said blocking means, the blocking means after the movement of the release means from the inoperative into the first operative position remaining in blocking condition during a time interval determined by the control member and then assuming the unblocking condition to allow the release means to be moved into the second operative position for operating the fading means;
coupling means interposed between said control member and the drive means to allow relative movement between the drive means and said member;
arresting means for controlling the standstill condition of said control member and for arresting it after said time interval;
the coupling means allowing the operative condition of said drive means with the control member in standstill condition, the arresting means including an abutment surface connected to and movable with said control member along a predetermined path, and said release means having a counter-abutment surface movable in and out of said predetermined path, in the first operative position of the release means the counter-abutment surface being within said path for arresting the control member after said time interval and in the second operative position of the release means the counter-abutment surface being out of said path.

9. Camera as claimed in claim 8, wherein said coupling means comprise a friction clutch.

10. An improved cine-camera for cinematographic film of the type having optical means defining an optical axis;
- means for guiding the film and for exposing successive image frames on said optical axis;
- shutter means for intercepting said optical axis and being operable to alternately assume an intercepting condition and an open condition;
- drive means for said film and said shutter having an operative and an inoperative condition;
- fading means operable between an open condition and a fade-out condition for continuously altering the amount of light reaching the image frame on said axis;
- release means for controlling the operation of said drive means and being movable from an inoperative position into a first operative position for rendering operative drive means, and from the first into a second operative position to operate said fading means; the improvment comprising:
- blocking means for preventing movement of said release means from the first into the second position, said blocking means having a blocking and an unblocking condition;
- programming means controlled by said release means and comprising at least one control member movable by said drive means in a predetermined direction for controlling said blocking means, whereby after the movement of the release means from the inoperative into the first operative position said blocking means remains in blocking condition during a time interval determined by the control member and after said time interval said blocking means assumes the unblocking condition to allow the release means to be moved into the second operative position for operating the fading means,
- control means for said fading means being movable together with the control member by said drive means in the predetermined direction, said control means including at least
  - fade-out means controlling a fade-out program of said fading means, and
  - fade-in means arranged after the fade-out means when seen in said predetermined direction and controlling a fade-in program of said fading means;
- coupling means interposed between at least one of said programming means and the drive means to allow relative movement between the drive means and said at least one programming means including manually operable clutch means having an open condition in which the driving connection to said at least one programming means is interrupted, and a closed condition in which a driving connection is established; a spring means for resetting said programming means into a predetermined end position; and stopping means having a stop surface connected to and movable with said at least one programming means along a predetermined path, and said release means having a counter-abutment surface being within said path when the release means assume the second operative position for stopping said at least one programming means at the beginning of a program following the fade-out program when driven by said spring means and program-selector means and for opening said clutch means to allow the spring means to drive said programming means independently from the drive means.

11. Camera as claimed in claim 10, further comprising locking means for locking said release means in the second operative position at least during said fade-out program.

12. Camera as claimed in claim 11, wherein said locking means comprise a locking surface adjacent to said abutment surface connected to said control member.

13. Camera as claimed in claim 10, wherein said stop surface is moveable between a position within said path and a position out of said path, the camera further comprising a program -selector member for moving said stop surface.

14. An improved cine-camera for cinematographic film of the type having optical means defining an optical axis;
- means for guiding the film and for exposing successive image frames on said optical axis;
- shutter means for intercepting said optical axis and being operable to alternately assume on intercepting condition and an open condition;
- drive means for said film and said shutter having an operative and an inoperative condition;
- fading means operable between an open condition and a fade-out condition for continuously altering the amount of light reaching the image frame on said optical axis;
- release means for controlling the operation of said drive means and being movable from an inoperative position into a first operative position for rendering operative said drive means, and from the first into a second operative position to operate said fading means; the improvement comprising:
- blocking means for preventing movement of said release means from the first into the second position, said blocking means having a blocking and an unblocking condition;
- programming means controlled by said release means and comprising at least one control member movable by said drive means in a predetermined direction and controlling said blocking means, the blocking means after the movement of the release means from the inoperative into the first operative position remaining in blocking condition during a time interval determined by said control member and then assuming the unblocking condition to allow the release means to be moved into the second operative position for operating the fading means, and
- control means for said fading means being movable together with the control member by said drive means in the predetermined direction, said control means including at least
  - fade-out means controlling a fade-out program of said fading means, and
  - fade-in means arranged after the fade-out when seen in said predetermined direction and controlling a fade-in program of said fading means;

clutch means interposed between at least one of said programming means and the drive means to allow relative movement between these means, said clutch means being controllable by said release means and having an open condition in which the driving connection to said programming means is interrupted, and a closed condition in which a driving connection is established, in inoperative position of the release means the clutch means being in open condition, in the operative position of the release means the clutch means being forced to assume the closed condition; urging means actuable by said release means for urging the clutch means into the closed condition when the release means assume any one of the operative positions;

program-selector means for opening said clutch means against the force of said urging means in an activated position to allow said programming means to be moved independently from said drive means; and means for moving said at least one programming means independently from said drive means.

15. Camera as claimed in claim 14, further comprising interrupting means having an operating position and an interrupting position for bringing said drive means in the inoperative condition and being controllable by said program -selector means, in activated position of the latter the interrupting means being in interrupting position.

16. Camera as claimed in claim 14, wherein said programming means include shaft means bearing said control member and the control means, and said means for moving the programming means comprise a toggle spring device for resetting the programming means into a predetermined end position, the device reaching a first dead center during the fade-out program, before reaching said first dead center thus urging said programming means in a rotating direction opposite to said predetermined direction imparted by the drive means, but after having passed the first dead center urging the programming means in said predetermined direction.

17. Camera as claimed in claim 16, wherein said first dead center is reached when the programming means have rotated about 180° from the predetermined end position at the end of the fade-out program, the toggle spring device having a second dead center at the end of a program following the fade-out programm, said programming means and the toggle spring device forming an oscillatory system freely swinging out after having opened the clutch means by the program -selector means, the camera further comprising latch means for latching the programming means freely swinging beyond the second dead center at the end of said program following the fade-out program.

18. Camera as claimed in claim 17, wherein said latch means comprise pawl means connected to the programming means and a latching surface on the release means.

19. Camera as claimed in claim 14, further comprising self-locking means for locking said clutch means in closed condition after said fade-out program when said release means render inoperative the drive means and locking the clutch means from the beginning of a program following said fade-out program at least until the end of that program, but at the latest until the end of the fade-in program.

20. Camera as claimed in claim 19, wherein said self-locking means comprise a halting device for halting said release means in an intermediate position between the inoperative and the first operative position, in said intermediate position the drive means being inoperative but the clutch means being in closed condition.

21. Camera as claimed in claim 20, wherein said halting device comprise a halting surface connected to said control member, and said release means comprise a counter-surface for engagement with said halting surface.

22. Camera as claimed in claim 21, further comprising a locking surface connected to said control member cooperating with said counter-surface of said release means for locking the latter in the second operative position after the blocking has assumed the unblocking position, said locking surface preceding said halting surface.

* * * * *